Figure 1:
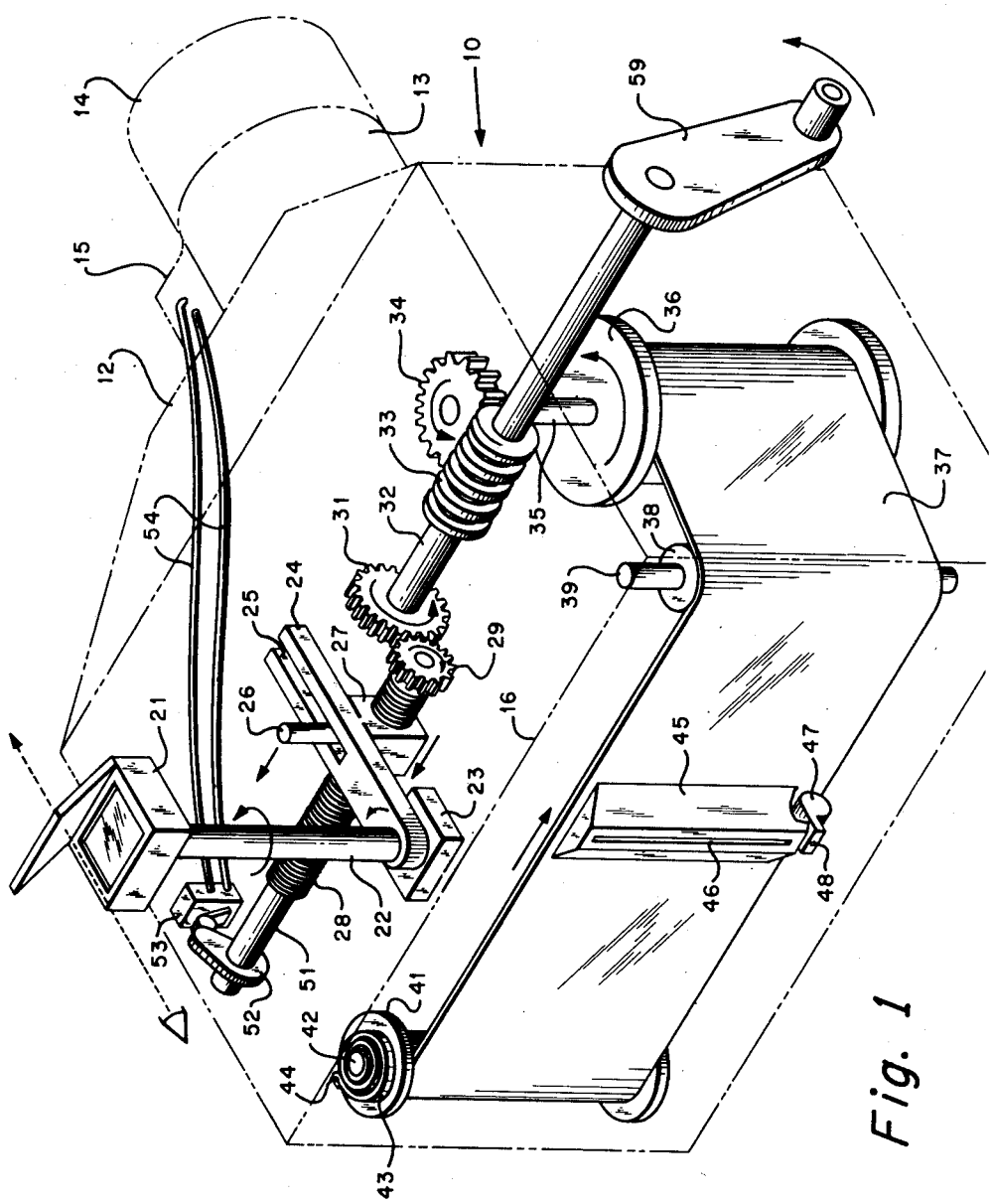

May 7, 1957 D. A. HOYT 2,791,165
AUXILIARY TRAJECTORY RECORDING MEANS FOR CAMERAS
Filed June 28, 1955 2 Sheets-Sheet 1

INVENTOR.
DONALD A. HOYT
BY

*L. M. Smith, Jr.*
ATTORNEYS

May 7, 1957 D. A. HOYT 2,791,165
AUXILIARY TRAJECTORY RECORDING MEANS FOR CAMERAS
Filed June 28, 1955 2 Sheets-Sheet 2

INVENTOR.
DONALD A. HOYT
BY
*L. M. Smith, Jr.*
ATTORNEYS

United States Patent Office 2,791,165
Patented May 7, 1957

2,791,165

AUXILIARY TRAJECTORY RECORDING MEANS FOR CAMERAS

Donald A. Hoyt, Levittown, Pa.

Application June 28, 1955, Serial No. 518,704

3 Claims. (Cl. 95—36)

(Granted under Title 35, U. S. Code (1952), sec. 266)

The invention described herein may be manufactured and used by or for the Government of the United States of America for governmental purposes without the payment of any royalties thereon or therefor.

The instant invention relates to auxiliary trajectory recording adaptor means for cameras, and more particularly to auxiliary trajectory recording adaptor means for cameras whereby a conventional camera can be converted for recording the trajectory of airborne objects, such as missiles dropped both from high-speed and low-speed aircraft.

There are various known types of camera assemblies especially designed for recording the trajectories of airborne objects. However, such specialized camera assemblies are universally costly to construct, and several types are further limited as to their utility by undesirable operating characteristics, such as limited speed of operation, bulky configurations, or negative sizes so small as to preclude adequate definition of the attitude of the airborne object. In addition, existing equipment capable of operating at very high speeds to record high-speed drops is not readily adjustable for low-speed operation to record low-speed drops.

The present invention contemplates a relatively simple arrangement of auxiliary equipment readily incorporated in an existing camera of suitable characteristics to adapt such a camera for recording both high-speed and low-speed drops from various types of aircraft.

An object of this invention is the provision of inexpensive means for readily adapting an existing camera assembly for recording the trajectory of an airborne object.

Another object is to provide manually operated auxiliary means for incorporation in an existing camera assembly in order to render it suitable for recording both high-speed and low-speed trajectories of airborne objects.

Still another object is the provision of auxiliary means which may readily be incorporated in an existing camera with minimum modification thereof to convert it into a trajectory recording camera.

A final object of the instant invention is to provide coordinated target tracking, film shielding, and shutter controlling means whereby a camera in which such means are incorporated may be used to record the trajectory of an airborne object.

Figure 2:
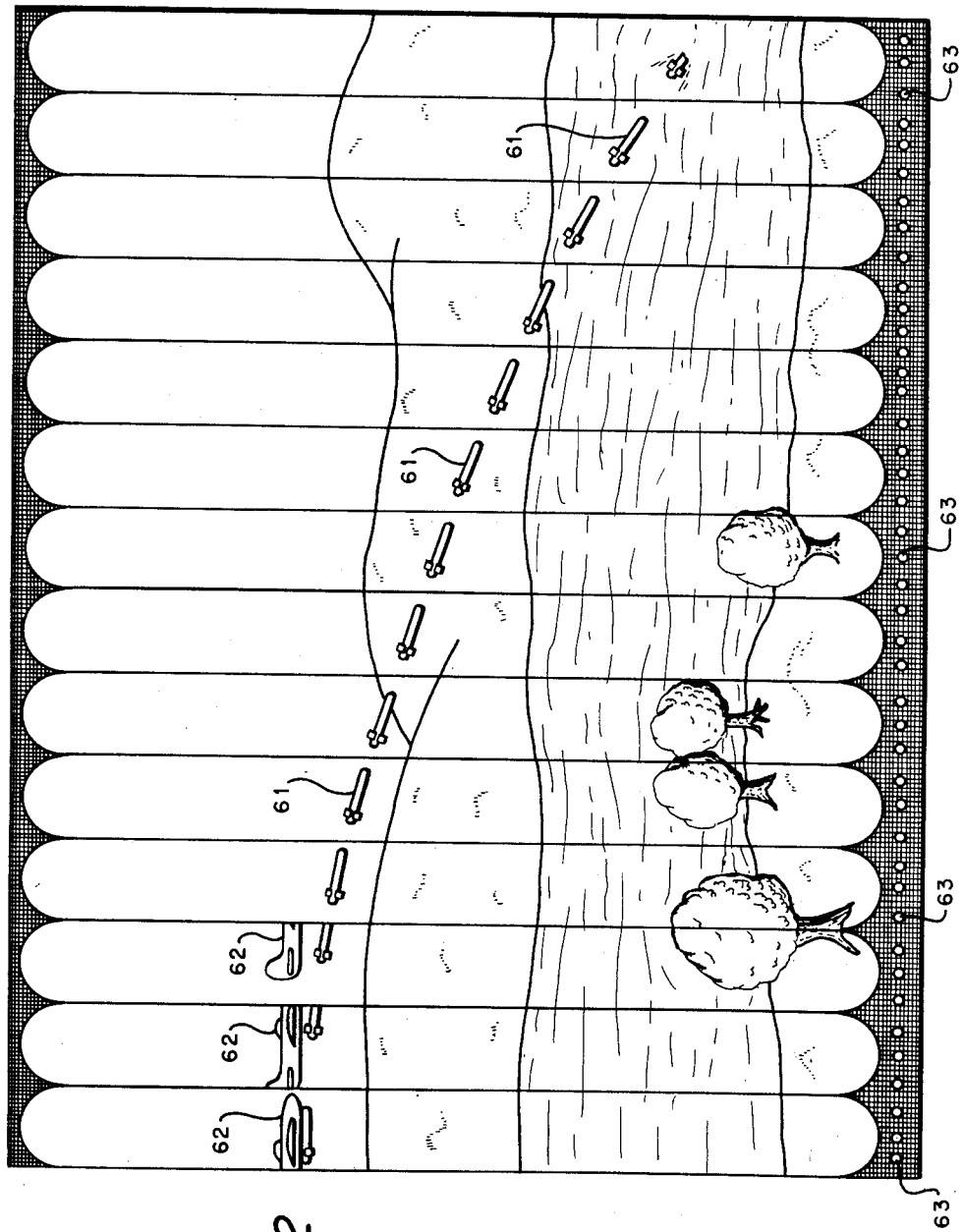

Other objects and many of the attendant advantages of this invention will be readily appreciated as the same become better understood by reference to the following detailed description when considered in connection with the accompanying drawings wherein:

Fig. 1 shows a simplified isometric view of the essential elements of a preferred embodiment of the instant invention in operative relation to a conventional camera assembly shown in phantom, and Fig. 2 represents a typical trajectory recorded by means of the instant invention to indicate the flight path of an object dropped from a high-speed aircraft.

Referring now to the drawings, wherein like reference numerals refer to like or corresponding parts, there is shown in Fig. 1 a simplified isometric view of the principal elements of the instant invention shown in operative relationship to a suitable camera assembly in which they might readily be incorporated, which is represented in Fig. 1 by a phantom outline in order to facilitate a clear showing of the essential features of the instant invention. The phantom outline generally designated by the reference numeral 10 represents a camera assembly including a generally rectangular camera body 11 to which is secured a lens cone 12 at the apex of which a lens assembly 13 and a shutter assembly 14 including a shutter actuator 15 are mounted. It should also be understood that this camera assembly represented thus is conventional in that it is designed to accommodate a generally rectangular demountable magazine assembly fitted over its open rear end 16 so that a length of the film supported within the magazine on conventional supply and take-up spools is extended over substantially the entire opening 16 and supported in this position by suitable means, such as a conventional pressure plate, for maintaining it in a true plane. The auxiliary equipment provided by the instant invention for recording the trajectory of an airborne object includes sighting means such as a conventional aircraft sight assembly 21 mounted by means of support 22 and socket fitting 23 for rotation relative to the camera body 11 to which the socket 23 may be fixedly secured. The support 22 is fitted with a fixedly secured radially extending arm 24 with a longitudinal slot 25 therethrough for engagement with a pin or boss 26 projecting from an internally threaded block 27 engaging and mounted non-rotatably for rectilinear movement along a drive screw 28 rotatably mounted transversely of the camera body 11 and fitted at one end with a driven pinion 29 fixedly secured thereto and engaging a drive gear 31 mounted on one end of a drive shaft 32 also rotatably mounted transversely of the camera body 11 and fitted at the other end with crank assembly 59 for manual rotation of the drive shaft 32, the drive gear 31 attached thereto, the driven gear 29 and the drive screw 28 to which it is fixedly secured. In addition, the drive shaft 32 is fitted with a worm or drive screw 33 secured intermediate the ends thereof and engaging gear 34 fixedly secured to the end of the shaft 35 rotatably mounted within the camera body 11 and arranged to support a take-up spool 36 on which is wound one end of an elongated flexible curtain 37 of opaque fabric or other suitable material, also supported by an idler roller 38 rotatably supported within the camera body 11 on a shaft 39 and by a supply spool 41 rotatably supported within the camera body 11 by a shaft 42 and biased in a direction to tension the curtain 37 by a spring 43, one end of which is restrained by a fixed stop 44. The rigid frame 45 attached to the curtain 37 intermediate its ends and over a suitable opening therethrough, not visible in Fig. 1, extends transversely of the curtain and provides a transverse slit 46 therethrough for sequentially exposing successive narrow transverse strips of the extended portion of the film disposed immediately behind the curtain 37 as the rigid frame 45 is drawn across the camera body 11 by the curtain 37 to which it is secured. In addition, the frame 45 may support or include a housing 47 for a light source adjacent its upper or lower end which has an aperture 48 therethrough, so that illumination of this light source by a suitable timing circuit at predetermined time intervals will expose the film through aperture 48 to produce timing marks along the edge of the film, as shown in Fig. 2, as the frame 45 travels across the film.

In order to provide for coordinated operation of the existing portions of the camera assembly with the auxiliary equipment described above for the purpose indicated, the drive screw 28 includes a shaft extension 51 extending from the end thereof opposite to that on which the gear 29 is mounted to which a cam element 52 is fixedly secured for cyclic operation of the switch assembly 53, which in turn is connected by wire leads 54 to the shutter actuator 15 responsive to an electrical impulse from the switch assembly 53 to operate the shutter 14 of the camera assembly 10.

In operation, a camera assembly incorporating the instant invention is set up facing the area across which an airborne object is expected to travel. Referring to the showing in Fig. 2 which represents the trajectory of an aerial torpedo dropped from an airplane, the sight assembly 21 would be trained on the aircraft by the camera operator by manually operating the crank 59 to produce rotation of the drive screw 28 and accompanying translational movement of the internally threaded block 27 and pin 26 effective to rotate arm 24 by engagement with slot 25 therethrough to produce rotation of the support 22 and the sight assembly 21 mounted thereon. As the camera operator continues to train the sight assembly on the aircraft and then on the object, such as a torpedo, dropped therefrom the rotation of the crank assembly 59 by means of which the sight assembly 21 is continually trained on the target produces simultaneous rotation through gear 34, worm 33 and shaft 35 of the spool 36 to roll up the curtain 37 against the restraining influence of the spring 43 acting on spool 41. This movement of the curtain 37 causes the frame 45 with the slit 46 therethrough to traverse the portion of film extending across the magazine mounted on the rear of the camera assembly 10. At the same time, the rotation of the drive screw 28 producing training movement of the assembly 21 causes the cam element 52 to cyclically operate the switch assembly 53 to actuate the shutter assembly 14 and thereby expose successive immediately adjacent narrow transverse strips of the film as the frame 45 travels across the extended portion of the film. A typical result obtained by this operation is represented in Fig. 2 showing the instantaneous position of an airborne object 61 and its instantaneous attitude along a large succession of points on its tranjectory after its release from an airplane 62. The light source within the housing 47 is also illuminated by a timing circuit at predetermined intervals during the movement of the curtain 37 to expose the film through the aperture 48, forming the timing marks 63, illustrated in Fig. 2.

The showing in Fig. 2 represents a high-speed drop from an airplane 62 traveling at a sufficient speed to produce relatively large horizontal movement of the object released therefrom as compared to its vertical movement due to gravity before it reaches the end of its trajectory. In low-speed drops, such as those from relatively slow moving aircraft such as lighter-than-air ships, the horizontal travel of an object dropped is relatively small compared to its vertical travel due to gravity. The instant invention is readily arranged to record such low-speed drops by the simple expedient of rotating the entire camera assembly, including the auxiliary equipment shown in Fig. 1, through 90 degrees about its longitudinal axis through the center of the lens and the center of the length of film to be exposed so that the support for the sight assembly 21 is positioned for rotation about a horizontal axis instead of a vertical axis and the housing 45 supported by the curtain 37 travels vertically to record horizontal exposures instead of traveling horizontally, as shown in Fig. 1, to record vertical strip exposures, as shown in Fig. 2. With this arrangement the instant invention records the trajectories for low-speed drops in which the vertical fall is substantially greater than the horizontal travel.

Thus, the instant invention provides means for readily adapting a conventional camera assembly for effectively recording the trajectory of an airborne object under a relatively wide range of conditions, such as both low-speed and high-speed drops from various types of aircraft and for evaluating the landings and take-offs of aircraft themselves.

The details of the drive mechanism and the shutter control system disclosed in Fig. 1 are intended as illustrative only, since various different types of drive mechanisms could be used as necessary to most suitably accommodate various camera assemblies and since the shutter assembly control system illustrated can be replaced by any corresponding system suitable for the particular type of shutter to be controlled. In any case, the critical relationship between the rate of travel of the sight assembly 21 and the slit 46 in the frame 45 must be maintained by selection of suitable drive ratios for the sight drive mechanism and for the curtain drive mechanism, in order to insure that the angular rate of movement of the sight assembly and the translational movement of the slit 46 may be made to coincide continuously with the angular rate of movement of the light rays passing through the lens assembly to record the position of the object being tracked on the film. It is also important to insure that the initial positions and the directions of movement of the sight assembly 21 and the slit 46, respectively, are such that the line of sight through the sight assembly to the object is coplanar with a line through the nodal point of the lens assembly and through the slit 46, so that the object will appear in every strip of film exposed.

Obviously, many modifications and variations of the present invention are possible in the light of the above teachings. It is, therefore, to be understood that within the scope of the appended claims the invention may be practiced otherwise than as specifically described.

What is claimed is:

1. Means for recording the trajectory of an airborne object with a camera including a camera body, lens and shutter assemblies mounted thereon, and a closure member attached to the camera body and arranged to support a light sensitive surface within the camera body in a plane spaced from the lens assembly, said means comprising a sight assembly rotatably mounted upon the camera body, a sight assembly drive mechanism also mounted upon the body, a traveling curtain mounted within the camera body, said curtain having a transverse slit therethrough, a curtain drive mechanism mounted upon the camera body, manual operating mechanism interconnecting said sight assembly drive mechanism and said curtain drive mechanism and operable to produce coordinated movement of the respective drive mechanisms, and a shutter assembly control system also connected to and controlled by said manual operating mechanism for cyclic operation of the shutter assembly continuously coordinated with the displacement of the sight assembly and the traveling curtain.

2. Auxiliary means for recording the trajectory of an airborne object with a camera assembly including a hollow camera body, lens and shutter assemblies mounted thereon, and a closure member mounted upon the camera body and arranged to support a light sensitive surface within the camera body in a plane spaced from the lens assembly, said auxiliary means comprising a rotatably mounted sight assembly; a sight assembly drive mechanism including a drive screw rotatably mounted upon the camera body, a non-rotatable internally threaded block mounted thereon and provided with a pin projecting therefrom, a longitudinally slotted arm engaging said pin, and a rotatably mounted sight assembly support to which said arm is fixedly secured; a traveling flexible curtain within the camera body; said curtain having a transverse slit therethrough; a curtain drive mechanism including a take-up spool rotatably mounted within the camera body to which one end of the curtain is secured, an idler roller rotatably mounted within the camera body for positioning the curtain, a supply spool rotatably mounted within the camera body for supporting the opposite end of the curtain, and biasing means connected to said supply spool and operative to tension the portion of the curtain between the supply spool and the take-up spool; a manually controlled operating mechanism including a rotatably mounted drive shaft, a hand crank fixedly secured thereto, a first gear train operatively interconnecting said drive shaft and the sight assembly drive mechanism, and a second gear train operatively interconnecting said drive shaft and the curtain drive mechanism; and a shutter assembly control system including a switch assembly and a controlling cam element therefor also operatively connected to the drive shaft of said operating mechanism.

3. A device as described in claim 1, wherein said manual operating mechanism includes a rotatably mounted drive shaft and a hand crank fixedly secured thereto, and wherein said shutter assembly control system includes a camming means operatively interconnected with said drive shaft for rotation therewith and actuating means operable to cyclically operate said shutter assembly in response to rotation of said camming means.

References Cited in the file of this patent

UNITED STATES PATENTS 2,460,163    Bowen _____ Jan. 25, 1949